United States Patent [19]
Scott et al.

[11] 3,920,607
[45] Nov. 18, 1975

[54] STABILIZED POLYMER COMPOSITIONS

[75] Inventors: Gerald Scott, Knowle; Kenneth John Humphris, Frimley, near Camberley, both of England

[73] Assignee: J. A. Kemp & Co., London, England

[22] Filed: Aug. 24, 1973

[21] Appl. No.: 391,257

[52] U.S. Cl. 260/45.8 R; 260/45.7 P; 260/45.75 W; 260/45.75 R; 260/45.75 P; 260/45.75 N; 260/45.75 C; 260/45.75 M; 260/45.8 R; 260/45.9 NP; 260/45.95 D; 260/45.95 P
[51] Int. Cl.² .................. C08F 6/00; C08G 83/00
[58] Field of Search . 260/45.8 R, 45.75 R, 45.75 K, 260/45.75 N, 45.75 C, 936, 937, 980, 987, 429, 30.6 R, 45.9 NP, 45.95 P, 45.95 D, 23 XA, 23 H

[56] References Cited
UNITED STATES PATENTS

| | | | |
|---|---|---|---|
| 2,894,974 | 7/1959 | Lanham | 260/937 |
| 2,952,701 | 9/1960 | McConnell et al. | 260/45.8 |
| 2,974,158 | 3/1961 | Lanham | 260/937 |
| 3,022,330 | 2/1962 | Lanham | 260/937 |
| 3,081,331 | 3/1963 | Friedman | 260/30.6 |
| 3,090,799 | 5/1963 | Wahl et al. | 260/30.6 |
| 3,159,664 | 12/1964 | Bartlett | 260/980 |
| 3,293,327 | 12/1966 | Hechenbleikner | 260/936 |
| 3,297,631 | 1/1967 | Bown et al. | 260/45.95 |
| 3,354,240 | 11/1967 | Pochowicz | 260/45.95 |
| 3,361,846 | 1/1968 | Gleim et al. | 260/45.95 |
| 3,666,837 | 5/1972 | Rattenbury | 260/45.7 |
| 3,689,602 | 9/1972 | Ismail | 260/936 |

*Primary Examiner*—V. P. Hoke
*Attorney, Agent, or Firm*—Cushman, Darby & Cushman

[57] ABSTRACT

Polymers are rendered more resistant to oxidation by the incorporation of a compound containing at least one phosphate grouping in which the phosphorus atom and at least two of the three oxygen atoms attached thereto by single covalent bonds form part of a cyclic structure, the remaining atoms in the ring being carbon atoms, such that when only two of the three said oxygen atoms form part of a cyclic structure the third said oxygen atom is attached to hydrogen, a metal, a metalloid group, an alkyl or substituted alkyl radical or a hindered aryl radical. The compound may be formed in situ in the polymer from a precursor in which one of the —C—O—P— links of the cyclic structure is replaced by —C—OH HO—P—, or from an organo-soluble metal salt and a hydroxyphosphate corresponding to the antioxidant.

17 Claims, No Drawings

STABILIZED POLYMER COMPOSITIONS

This invention relates to polymer compositions, more particularly to polymer compositions having improved oxidative stability.

Most polymeric materials are susceptible to oxidation with a consequent deterioration in their useful properties. Unless precautions are taken to exclude oxygen, deterioration can be particularly severe during the processing of a polymeric material, for example during extrusion or moulding, when the polymeric material is in the liquid or semi-liquid state at high temperatures. Even at ordinary service temperatures, however, oxidation will occur especially when the material is subjected to outdoor conditions, and it is therefore normal practice to incorporate antioxidants and stabilisers into polymer compositions.

Numerous substances are used or have been proposed for this purpose with varying degrees of effectiveness or alleged effectiveness. Some substances which are among the most effective as antioxidants suffer from the disadvantage that they discolour the polymer, and their range of applicability is therefore limited. Organic phosphites of varying types are amongst the substances proposed or used as essentially non-discolouring antioxidants. It has also been proposed to add certain organic phosphates, for example tricresyl phosphate, to polymers as plasticisers, but it would not be supposed, on the basis of the known properties of phosphates, that any such compounds would have antioxidant activity. The present invention is based on the surprising discovery that certain phosphates are indeed effective antioxidants for polymers. Moreover it has been found that the powerful antioxidant activity of these phosphates is carried through to the processed polymer and finally, to the fabricated article so that whereas polymers stabilised by normal antioxidants are generally very susceptible to outdoor weathering conditions, if subjected to severe processing conditions, the antioxidants of the present invention give very good u.v. (ultra-violet) stability although they do not necessarily act as u.v. screening agents. An important consequence of this dual activity is that these stabilisers show very powerful synergism with conventional u.v. stabilisers which act by different mechanisms, particularly u.v. screening agents and the so-called "triplet quenching agents."

The phosphates having antioxidant activity are compounds containing at least one phosphate grouping in which the phosphorus atom and at least two of the three oxygen atoms attached thereto by single covalent bonds form part of a cyclic structure, the remaining atoms in the ring being carbon atoms, such that when only two of the three said oxygen atoms form part of a cyclic structure the third said oxygen atom is attached to hydrogen, a metal or metalloid group, an alkyl or substituted alkyl radical or a hindered aryl radical (as hereinafter defined). These phosphates are referred to hereinafter as cyclic phosphates, and a composition of the invention is accordingly a polymeric material containing such a cyclic phosphate as an antioxidant.

The present invention also provides a method of improving the oxidative stability of polymeric material which comprises incorporating into the material at any stage during its preparation a cyclic phosphate. As discussed below, the phosphate can also be incorporated in the form of precursors of the cyclic phosphates which readily give rise to cyclic phosphates, for example by dehydration, notably their hydrolysis products in which at least one of the phosphorus-oxygen rings is broken at one of the oxygen atoms giving rise to two hydroxyl groups, i.e. one of the —C—O—P— links of the cyclic structure is replaced by —C—OH HO—P—. The use of precursors can have certain advantages because the hydrolysis products are often more stable under normal storage conditions but may readily cyclise under usual polymer processing conditions.

The phosphates have economic advantages over the corresponding phosphites since the latter are more expensive to produce. The phosphates have certain other advantages over the phosphites, as discussed below.

The cyclic phosphates suitable for use in the compositions of the present invention include compounds having the following general formulae:

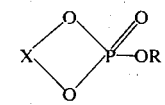

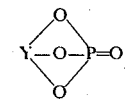

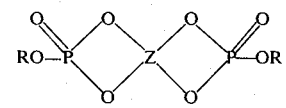

wherein R or each R represents hydrogen, $1/x$ of a metal ion of valency x or metalloid group such as ammonium and substituted ammonium, or an alkyl or substituted alkyl group or a hindered aryl group, and X, Y and Z each represent a hydrocarbon or substituted hydrocarbon group of the appropriate valency, the bonds shown linking the respective groups X, Y and Z to the adjacent oxygen atoms being bonds from carbon atoms of the groups X, Y and Z. The term "hindered aryl group" as used herein denotes an aryl group which contains at least one alkyl or alkoxy group in the ortho-position to the attached oxygen atom. Preferably this alkyl group is branched in the α-position; tertiary alkyl is especially preferred. Also included are phosphates of the formula:

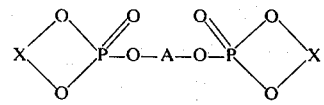

wherein a represents an alkylene or arylene group containing substituents as defined above, and X has the significance indicated above, and oligomeric or polymeric phosphates having recurring units of the formula:

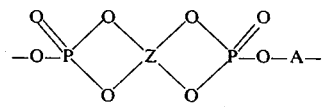

wherein A and Z each have the significance indicated hereinbefore.

The hydrocarbon or substituted hydrocarbon groups X and Z can be aliphatic or aromatic, while the group Y is generally aliphatic. In general, the ring formed with the phosphorus atom and its two singlebonded oxygen atoms will not have more than 7 ring members, rings with 5 or 6 ring members are preferred. Where X represents an aromatic radical, the two oxygen atoms linked to X are linked to adjacent nuclear carbon atoms, i.e. in the ortho-position. The same applies to the corresponding pairs of oxygen atoms where Z represents an aromatic radical. In the case of polynuclear aromatic radicals, the two oxygen atoms linked to X are linked to carbon atoms which are adjacent to a common carbon atom which is common to two rings, or which are adjacent to a common carbon-carbon bridge.

Where X, Y or Z is an aliphatic group, the oxygen atoms linked thereto can be linked to adjacent carbon atoms or to carbon atoms that are separated by one, or, less usually, two carbon atoms.

Where the hydrocarbon group is subsituted, the substituent or substituents may be, for example, halogen, hydroxyl or alkoxy.

Examples of aromatic groups X include o-phenylene, and 1,2-naphthylene; examples of aromatic groups Z include the tetravalent groups corresponding respectively to the loss of the 1,2,4 and 5 hydrogen atoms from benzene, the 1,2,5 and 6 hydrogen atoms from naphthalene, and the 1,2,1' and 2' hydrogen atoms from biphenyl; examples of aliphatic groups X include alkylene groups such as ethylene, 1,2-propylene and 1,3-propylene; examples of aliphatic groups Y include those of the formula:

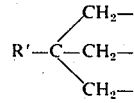

where R' is hydrogen, alkyl, hydroxyalkyl or alkoxyalkyl, and examples of aliphatic groups Z include those having the formulae: $C(CH_2-)_4$ and

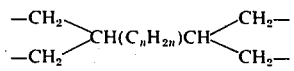

where n is 0 or an integer of, for example, from 1 to 10.

The group R may, for instance, be an alkyl, cycloalkyl, aralkyl or any such group having, for example, halogen, hydroxy or alkoxy substituents, more specifically a methyl, ethyl, 2-hydroxyethyl, 2-ethoxyethyl, isopropyl, n-butyl, t-buyyl, iso-octyl, dodecyl, stearyl, cyclohexyl or α-methylcyclohexyl, or a hindered aryl group such as phenyl having one or both ortho-positions substituted, for instance 2,6-di-t-butyl-4-methylphenyl, 3-methyl-6-t-butylphenyl, 4-methyl-6-t-butylphenyl, 2,4-dimethyl-6-(α-methylcyclohexyl)phenyl, 2,6-bis(α-methylcyclohexyl)-4-methylphenyl, 2,6-bis-(α-methylbenzyl)-4-methylphenyl, and 2,4,6-trimethylphenyl. Preferably R represents hydrogen or a metal ion or an organic radical which sterically hinders the hydrolysis of the phosphate such as 2,6-di-tert.butyl-phenyl or 2-tert.butyl-6-alkylphenyl and secondary and tertiary alkyl radicals.

Cyclic phosphate esters suitable for use in the compositions of the invention include catechol isodecyl phosphate, catechol 2,6-di-tert-butylphenyl phosphate, catechol 2-tert-butyl-5-methylphenyl phosphate, ethylene glycol 2,6-di-tert-butylphenyl phosphate, trimethylolethane phosphate, trimethylolpropane phosphate, bis-isodecyl pentaerythritol diphosphate, bis-phenyl pentaerythritol diphosphate, bis-4-tert-octylphenyl pentaerythritol diphosphate, bis-cyclohexyl pentaerythritol diphosphate, and dipentaerythritol diphosphate and polyphosphates derived from carbohydrates or trihydric alcohols.

Of particular potential commercial importance are those cyclic phosphates of the general class described by the above formulae in which R=H or $1/x$ of a metal or metalloid ion of valency $x$. Included in this sub-class are the compounds of the general structures:

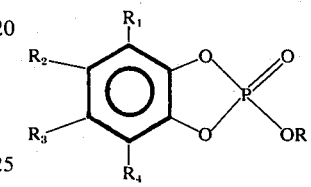 , 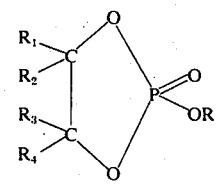

and

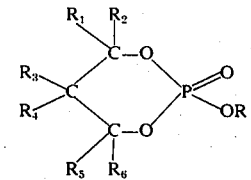

such as

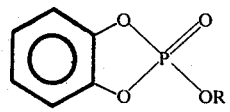 , 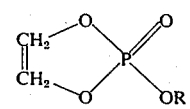

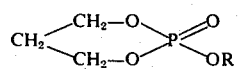 and 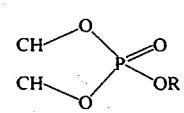

in which $R_1$ to $R_6$ respresent alkyl, substituted alkyl, particularly by hydroxyl or phosphate groups, aryl or carboxyl radicals or halogen atoms or two adjacent R groups together form an alkylene radical. R preferably represents a hydrogen atom although it may also represent an alkyl or hindered aryl radical.

As metal ions the non-transition metals of Groups IB and II such as Zn, Ca, Ba, Cd, Sn, and transition metal ions of atomic number from 22 to 29, 40 to 47 or 57 to 79 and in particular Fe, Co, Ni, Cu, and Mn are preferred. Other organic soluble (metalloid) ions are ammonium and substituted ammonium ions.

The cyclic phosphate esters used in the present invention can generally be prepared using known procedures, for example by reacting phosphorus pentoxide with the corresponding hydroxy compound. They can also be prepared from the corresponding phosphite by reaction with the approriate hydroperoxide.

The cyclic phosphates may be incorporated into the polymer in the form of their hydrolysis products such as:

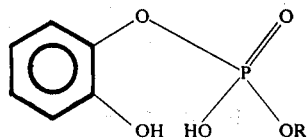

since it has been found that these are readily interconvertible with the cyclic compounds in the polymers by dehydration under the process conditions, and indeed the acyclic compounds may be involved in the mechanism of cyclic phosphate action and the actual formulation may consist of an equilibrium mixture of cyclic and acyclic phosphates. In the same way, the metal salts may be formed in situ by the reaction between an organic soluble metal salt (e.g. the stearate or laurate) and the corresponding hydroxy phosphate. The lifetime of the polymer article can be conveniently controlled by varying the ratio of the phosphate to metal ion.

It is believed that the phosphates (and their hydrolysis products) act as catalysts for hydroperoxide decomposition in contrast to the phosphites which react stoichiometrically. Consequently, the use of phosphate does not result in the formation of any undesirable by-products (other than other phosphates).

Polymeric materials that can be stabilised according to the present invention include olefin homopolymers, and copolymers with each other or with other monomers, for example polyethylene, polypropylene, poly(4-methylpentene-1), poly(butene-1), ethylene/propylene copolymers, ethylene/vinyl acetate copolymers; polymers and copolymers of vinyl aromatic compounds, for example polystyrene and styrene/butadiene/acrylonitrile copolymers; polymers and copolymers of vinyl halides; natural and synthetic rubbers, for example polybutadiene, polyisoprene, polychloroprene, copolymers of butadiene with styrene or acrylonitrile, butyl rubber and ethylene/propylene/diene terpolymer rubbers; polyesters, for example poly(methyl methacrylate), poly(ethylene terephthalate), glycol maleate/styrene interpolymers; polyamides, for example nylon 66 and nylon 11; polycarbonates; polyacrylonitrile; and polyurethanes, particular those based on polyethers.

Suitable amounts of the cyclic phosphate ester or its acyclic precursor are from 0.001 to 5% of the weight of the polymer but it is preferred to use at least 0.01% and particularly at least 0.05%, and preferably not more than 1% and more particularly not more than 0.2 or 0.5%. The phosphate may be added as pure cyclic phosphate, pure acyclic phosphate or as a mixture of these.

The cyclic phosphate ester or its acyclic precursor may be added at any convenient stage before or at the point where its protective action needs to be exerted. It is generally convenient to add the phosphate ester after polymerisation and after any purification treatment, very suitably together with other additives if these are to be used, by any of the methods normally used to incorporate additives in solid polymers, e.g. by the addition of a solution of the additive or additives in a volatile solvent to the polymer powder, followed by the evaporation of the solvent; by dry mixing; by milling; by extrusion compounding; Banbury treatment or the like.

The use, in addition to the cyclic phosphate esters, (or their precursors) of other antioxidants, and stabilisers is frequently desirable in order to improve the stability of the polymer at lower temperatures. The cyclic phosphate esters have the advantage that they decrease the undesirable tendency of some of these antioxidants to lower the stability of the polymer at high temperatures and powerful synergistic effects are observed in most cases.

Suitable antioxidants to be used in addition to the cyclic phosphate esters include phenols such as 2,6-di-tert-4-methylphenol, 4,4'-thiobis-(3-methyl-6-tert-butyl)phenol, 1,3,5-trimethyl-2,4,6-tris(3', 5'-di-tert-butyl-4'-hydroxy-benzyl)benzene, octadecyl ester of $\beta$-(3,5-di-tert-4-hydroxphenyl)propionic acid, condensates of phenols with aldehydes such as crotonaldehyde or glutaraldehyde, dialkyl thioalkanoates such as dilauryl thiodiproprionate, metal dialkyl-dithiocarbamates such as zinc dibutyldithiocarbamate, metal dialkyldithiophosphates such as zinc dinonyldithiophosphate, trialkyltrithiophosphites, dialkylthioethers such as dihexadecylthioether, organic phosphites such as tris(-nonylphenyl)phosphites, and certain organic phosphonates, and especially mixtures of two or more of these compounds since a synergistic effect is frequently observed. Particularly effective mixtures include a sulphur-free phenol and a sulphur-containing compound.

Other suitable stabilisers include melt stabilisers such as dihydroanthracene, light stabilisers such as 2-hydroxybenzophenones, substituted benzotriazoles, metal complexes such as organo-nickel complexes, and cyanoacrylates, other organic phosphorus compounds, some of which are antioxidants (also often added to reduce staining by antioxidants), metal deactivators, and materials of the type used as stabilisers for polyvinyl chloride, e.g. basic inorganic materials and other HCl acceptors,, for instance epoxides and metal soaps.

Suitable amounts of these stabilisers or antioxidants or antioxidant mixtures are from 0.01 to 2% of the weight of the polymer or copolymer, but is is preferred to use at least 0.05% and particularly at least 0.1%, and preferably not more than 1% and particularly not more than 0.5%.

Other materials which may be present in the polymer composition include cross-linking agents, blowing agents, plasticisers, fillers, nucleating agents, slip agents, antistatic agents and pigments.

The effectiveness of the cyclic phosphates and their precursors of the invention as oxidation inhibitors for polymeric materials is illustrated by the following Examples. Examples 1, 5, 15 to 17 and 26 illustrate the preparation of typical such phosphates.

EXAMPLE 1

8 g of catechol-(2,6-di-tert-butyl-4-methylphenyl)-phosphite and 2 g of tert-butyl-hydroperoxide were heated in chlorobenzene (100 ml) at 75°C. until no further hydroperoxide remained ( $\cong$ 4 hours). Removal of the solvent yielded a brown solid which, after treatment with methanol, gave a white crystalline product in 80% yield. After recrystallisation from ethyl acetate the catechol-(2,6-di-tert-butyl-4-methylphenyl)phosphate melted at 223°–5°C. and analysed correctly (C = 67.21, H = 7.30, P = 8.35).

EXAMPLE 2

The cyclic phosphate used was catechol 2,6-di-t-butyl-4-methylphenyl phosphate. The desired weight of this compound was dissolved in 100 ml of methylene chloride in a round-bottomed flask, and the solution was added to 50 grams of stabiliser-free polypropylene powder of initial melt flow index 1.56 (Measured by B.S. Test method 2782, Part 1, 1965 at 230°C. using a 0.0465 inch diameter die). The resulting slurry was agitated manually for about 5 minutes, and the solvent was then removed by evaporation under reduced pressure with concurrent rotation of the flask. Occasionally the walls of the flask were washed down with additional small quantities of solvent to incorporate final traces of the cyclic phosphate. Finally the distillate receiver of the evaporator was emptied and rotary evaporation continued for a further 30 minutes to ensure removal of all traces of solvent.

15 g samples of this impregnated polymer powder were then pressed between polished stainless steel plates in an induction press at a pressure of 28 tons per square foot for 2 minutes at 195°C.; this resulted in a clear homogeneous film having a thickness of 0.005 inch. 1 gram of this film was cut into strips which were then placed in a reaction vessel which formed part of an apparatus designed to measure oxygen uptake at 760 mm pressure by material in the reaction vessel, and the vessel was purged with oxygen and thermostatted at 150°C. At the film thickness used, rates of oxidation are independent of film thickness i.e. not diffusion controlled.

A comparative experiment was carried out under the same conditions using a 75:25 mixture of dilauryl thiodipropionate and pentaerythrityl tetra 3(3',5'-di-t-butyl-4'-hydroxyphenyl)propionate, presently considered a good antioxidant for polypropylene, instead of catechol 2,6-di-t-butyl-4-methylphenyl phosphate.

Results are shown in the Table below, in which A indicates polypropylene containing the cyclic phosphate and B indicates polypropylene containing the comparative mixture.

|  | % by weight of antioxidant in polypropylene | | | | | | | |
|---|---|---|---|---|---|---|---|---|
|  | 0.20 | | 0.25 | | 0.30 | | 0.35 | |
| Induction period to oxidation (Hrs.) | A | B | A | B | A | B | A | B |
|  | 170 | 42.5 | 262.5 | 100 | 355 | 155 | 447.5 | 212.5 |

The significantly greater effectiveness of the cyclic phosphate at all concentrations is apparent. A film moulded in the same way without antioxidant showed substantially no induction period.

EXAMPLES 3 AND 4

The cyclic phosphate of Example 1 was mixed into polypropylene at 200°C. using a sealed mixer which gave similar conditions to those normally encountered in extrusion. After mixing for a standard time (10 mins), the samples were compression moulded to film under the conditions of Example 2 and the films were exposed to u.v. light in a "black-lamp/sunlamp" accelerated exposure cabinet at ambient temperature until embrittlement occurred. Time to embrittlement is given in the Table.

| Example | 3 | 4 | Control |
|---|---|---|---|
| % by weight of antioxidant in polypropylene | 0.3 | 0.1 | 0 |
| Embrittlement time (hours) | 214 | 164 | 23 |

EXAMPLE 5

71 g of phosphorus pentoxide were heated with 137 g of catechol for 30 minutes at 100°C. Distillation of the product gave a liquid product (b.pt 225°–230°C/3mm) which was hydrolysed with a small amount of water to mono(2-hydroxy-phenyl)phosphoric acid. This was recrystallised from benzene/ethyl acetate to give a white solid (m.pt. 139°–141°C).

EXAMPLES 6 TO 8

Commercial high density polyethylene was processed by the technique described in Examples 3 and 4 using, as antioxidant, the phosphate of Example 5 at 1% concentration by weight on the polymer. Only the temperature and processing time were varied. The u.v. embrittlement times of the 0.01 in. films produced are given in the Table.

| | Temperature | Processing time | Embrittlement time |
|---|---|---|---|
| Ex 6 | 160°C | 5 mins | >1350 hrs |
| Ex 7 | 200°C | 10 mins | > 950 hrs |
| Ex 8 | 200°C | 60 mins | > 950 hrs |
| Control | 200°C. | (no additive) 5 mins | 370 hrs |

EXAMPLES 9 TO 14

The phosphate ester prepared by the method of Example 5 was incorporated into polypropylene by mixing at 200°C. by the method of Example 3, both alone and in combination with a commercial u.v. absorber (U.V. 531; 2-hydroxy-4-octyloxy-benzophenone) and pressed into 0.01 inch films. The u.v. embrittlement times found are given in the Table.

| Example | Stabiliser | Embrittlement Time (hrs) |
|---|---|---|
| 9 | 0.1% phosphate | 186 |
| 10 | 0.1% U.V. 531 | 88 |
| 11 | 0.3% U.V. 531 | 88 |
| 12 | 0.1% phosphate+0.1% U.V.531 | 182 |
| 13 | 0.1% phosphate+0.3% U.V.531 | 210 |
| 14 | 0.3% phosphate+0.1% U.V.531 | 255 |
| Control (unstabilised polypropylene) | | 80 |

Powerful synergistic effects are observed at concentrations considerably below those normally required for effective u.v. stabilisation.

EXAMPLE 15

A mixture of cis and trans isomers of cyclohexane-1,2-diol were reacted with phosphorus oxychloride in the presence of a slight stoichiometric excess of pyridine. After removing the pyridine hydrochloride by filtration, excess pyridine was distilled off and water was added to the product. The mixture of cis and trans cyclohexane diol phosphates produced was isolated by the method of Brown and Higson (J. Chem. Soc. 1957, 2034) and after recrystallisation from acetone melted at 136°C. Molecular weight measurement by mass spectrograph indicated that the products had the strucure of the acyclic (hydrolysed) hydroxy phosphates.

EXAMPLES 16 AND 17

Ethylene glycol and propylene-1,2-diol were reacted with $POCl_3$ in exactly the same way as cyclohexane-1,2-diol of Example 15. The products obtained were liquids which could not be recrystallised.

EXAMPLES 18 TO 25

The phosphates esters obtained by the methods of Examples 15 to 17 were incorporated into polypropylene by the method of Example 3. After compression moulding to 0.008 inch films, the U.V. embrittlement times were measured, as listed in the Table:

| Example | Stabiliser | Embrittlement time hours |
|---|---|---|
| 18 | of Example 15 (0.1%) | 148 |
| 19 | of Example 15 (0.5%) | >250 |
| 20 | of Example 16 (0.1%) | 120 |
| 21 | of Example 17 (0.1%) | 160 |
| 22 | of Example 17 (0.5%) | >250 |
| Control (commercial polypropylene) | | 65 |

The phosphate esters of Examples 15 to 17 were then incorporated into polypropylene by the method of Example 3 in combination with two commercial stabilisers. The 0.008 inch films obtained gave the following embrittlement times:

| Example | Phosphate of Example | U.V. 531 (2-hydroxy-4-octoxybenzo-phenone) | Tinuvin 326 [2-(2-hydroxy)-3,5-di-tert. butyl-phenyl)-benzotriaz-ine] | Embrittlement time |
|---|---|---|---|---|
| 23 | 15 (0.3%) | 0.1% | — | >250 |
| 24 | 15 (0.3%) | — | 0.1% | >250 |
| 25 | 17 (0.3%) | 0.3% | — | >250 |

Control as for Examples 18 to 22

EXAMPLE 26

11.4 g of mono(o-hydroxyphenyl)phosphoric acid was dissolved in water and mixed with an aqueous solution containing 11.4 g of copper sulphate. The solution was treated with an aqueous solution of ammonia to pH 6–7. The yellow precipitate melted at 218°–220°C. Estimation of the copper indicated that the structure of the metal complex was that in which the copper atom satisfies two of the hydroxy groups of the phosphoric acid.

EXAMPLES 27 AND 28

The complex of Example 26 was mixed with polypropylene in a mixer which simulated commercial processing conditions, for 10 minutes at 200°C. at 0.1 and 0.5% concentration. The polymers were discharged into cold water and the melt flow index compared with that of the control containing commercial stabilisers. The results are shown below:

| | |
|---|---|
| Control (without processing) | 0.20 MFI |
| Control (after processing at 200°C. for 10 mins) | 0.85 MFI |
| Example 27 (0.1% Cu complex) | 0.22 MFI |
| Example 28 (0.5% Cu complex) | 0.20 MFI |

The copper complex is clearly a very powerful melt stabiliser for polypropylene.

EXAMPLES 29 AND 30

The polymers obtained in Examples 27 and 28 were compression moulded to film (thickness 0.008 ins) and irradiated in the accelerated test described in the earlier Examples. The embrittlement times were compared with a commercial polypropylene control processed in the same way but without the copper complex.

| | Embrittlement time (hrs) |
|---|---|
| Control (without additive) | 55 |
| Example 29 0.1% Cu complex | 76 |
| Example 30 0.5% Cu complex | 183 |

EXAMPLES 31 TO 32 o-Hydroxyphenyl phosphoric acid and nickel stearate were added to polypropylene in stoichiometric proportion in amounts such that the amounts of metal complex present in the polymer were 0.25 and 0.05% respectively; the polypropylene was processed by the method of Examples 27 and 28. The U.V. embrittlement times relative to the control were:

| | Embrittlement time (hrs) |
|---|---|
| Control | 54 |
| Example 31 (0.05% Ni complex) | 103 |
| Example 32 (0.5% Ni complex) | 153 |

The two component antioxidant system was also a very powerful melt stabiliser for the polymer at 200°C.

EXAMPLE 33

The phosphate of Example 5 was thoroughly mixed in powder form by ballmilling for 6 hours with nylon powder at 0.5 g/ 100 g of polymer and the resulting polymer was compression moulded to film of thickness 0.01 inch. The film was irradiated in the lamp described in Example 3 and compared with a control film without additive. Discolouration of the control occurred after 180 hours, whereas the stabilised polymer showed no change after 500 hours.

EXAMPLE 34

Commercial ABS polymer containing conventional stabilising additives (which include a phenolic antioxidant and a commerical phosphite stabiliser) was formulated by the method of Example 3 with 0.5 parts per hundred of the phosphate of Example 5 at 180°C. The polymer was pressed to film (0.01 inch) and irradiated as in Example 3. The change in carbonyl concentration of the polymer was measured at intervals and the time at which embrittlement occurred was noted. Carbonyl formation occurred three times as rapidly in the control sample than in the stabilised sample and embrittlement occurred in about one third of the time.

EXAMPLE 35

The phosphate of Example 5 was used as a synergistic mixture in PVC at 0.5% concentration with a typical Cd/Ba stearate stabiliser (1%). After processing at 180°C., the polymer was compression moulded to film (0.01 hrs). The initial colour of the polymer was much superior to the control and colour change on exposure to U.V. light is given at the time intervals shown below:

|  | Hours | | |
|---|---|---|---|
|  | 0 | 75 | 110 |
| control (Ca/Ba stearate) | yellow | black | black |
| + 0.5% phosphate | colourless | yellow | orange. |

We claim:

1. An oxidation-resistant polymer composition which comprises a synthetic polymer and, as antioxidant, at least one phosphate of the formula:

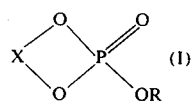 (I) or 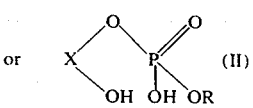 (II)

in which R represents a hydrogen or 1/x of a metal ion of valency $x$, said metal being selected from zinc, calcium, barium, cadmium, tin, iron, cobalt, nickel, copper and manganese, or an ammonium or substituted ammonium ion, a secondary or tertiary alkyl radical or an aryl radical which contains at least one alkyl group in the ortho-position to the attached oxygen atom said alkyl group being branched in the α-position, and X represents a hydrocarbon or substituted hydrocarbon radical selected from radicals of the formulae:

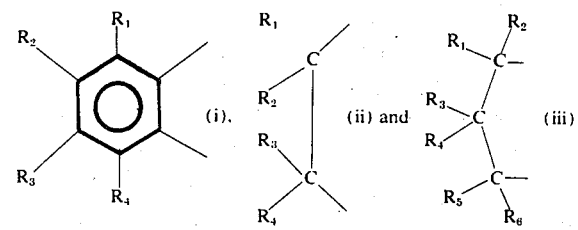

in which each of $R_1$ to $R_6$, which may be the same or different, represents an alkyl, aryl or carboxyl radical or a halogen atom or two adjacent such R radicals together form an alkylene radical or, in the case of formulae (ii) and (iii) a valency bond, in an amount from 0.001 to 5% by weight based on the weight of the polymer.

2. A composition according to claim 1 in which R is 2,6-di-tert.butyl-phenyl or a 2-tert.butyl-6-alkylphenyl radical or a secondary or tertiary alkyl radical.

3. A composition according to claim 1 in which the antioxidant is present in an amount from 0.05 to 0.5% by weight of the polymer.

4. A composition according to claim 1 which also contains a conventional antioxidant or stabiliser.

5. A process for preparing an oxidation resistant polymer composition which comprises blending a synthetic polymer with at leastone phosphate antioxidant, as defined in claim 1 in an amount from 0.001 to 5% by weight based on the weight of the polymer.

6. A process according to claim 5 in which the phosphate antioxidant is a phosphate of formula II.

7. A process according to claim 5 in which the antioxidant is a metal salt which is formed in situ from an organic soluble metal salt and the corresponding hydroxy phosphate.

8. A composition according to claim 1 in which the polymer is an olefin polymer.

9. A composition according to claim 1 in which the phosphate is present in an amount from 0.01 to 1% by weight based on the weight of the polymer.

10. A process according to claim 5 in which the phosphate is present in an amount from 0.01 to 1% by weight based on the weight of the polymer.

11. A process according to claim 5 in which the polymer is an olefin polymer.

12. A composition according to claim 1 in which at least one of $R_1$ to $R_6$ represents hydroxyalkyl.

13. A composition according to claim 1 in which the antioxidant is catechol-(2,6-di-tert.butyl-4-methylphenyl)phosphate.

14. A composition which comprises a synthetic polymer and, as antioxidant, at least one phosphate of the formula:

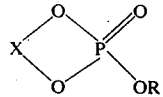 (I) or 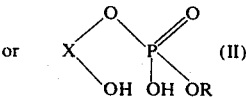 (II)

in which R represents a hydrogen or 1/x of a metal ion of valency $x$, said metal being selected from zinc, calcium, barium, cadmium, tin, iron, cobalt, nickel, copper and manganese, or an ammonium or substituted ammonium ion, and X represents a hydrocarbon or substituted hydrocarbon radical selected from radicals of the formulae:

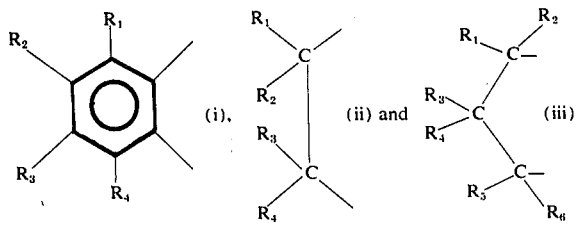

in which each of $R_1$ to $R_6$, which may be the same or different, represents an alkyl, aryl or carboxyl radical or a halogen atom or two adjacent such R radicals together form an alkylene radical or, in the case of formulae (ii) and (iii) a valency bond, in an amount from 0.001 to 5% by weight based on the weight of the polymer.

15. A composition according to claim 14 in which at least one of $R_1$ to $R_6$ represents hydroxyalkyl.

16. A composition according to claim 14 in which the antioxidant is ortho-phenylene-phosphonic acid, ortho-cyclohexylene phosphonic acid, 1,2-ethylene-phosphonic acid, 1,2-propylene-phosphonic acid or copper orthophenylene phosphate.

17. A composition which comprises a synthetic polymer and, as antioxidant, at least one phosphate of the formula:

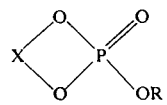 (I)

or

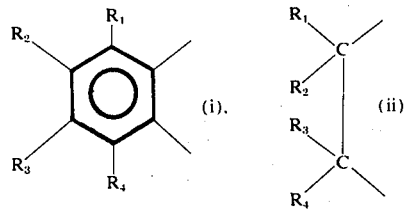 (II)

in which R represents an aryl radical which contains at least one alkyl group in the ortho-position to the attached oxygen atom, said alkyl group being branched in the α-position, and X represents a hydrocarbon or substituted hydrocarbon radical selected from radicals of the formulae:

and

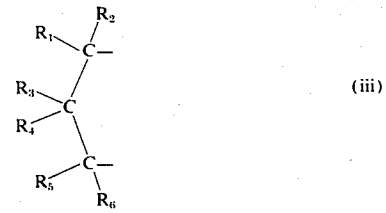

in which each of $R_1$ to $R_6$, which may be the same or different.

* * * * *

UNITED STATES PATENT OFFICE
CERTIFICATE OF CORRECTION

Patent No. 3,920,607          Dated November 18, 1975

Inventor(s) Gerald Scott and Kenneth John Humphries

It is certified that error appears in the above-identified patent and that said Letters Patent are hereby corrected as shown below:

In the heading:

Please correct the name of the assignee to read

--Gerald Scott-

Insert priority data as follows: --August 25, 1972

United Kingdom     39846/72--

Signed and Sealed this

Tenth Day of August 1976

[SEAL]

Attest:

RUTH C. MASON
*Attesting Officer*

C. MARSHALL DANN
*Commissioner of Patents and Trademarks*